US008897190B2

(12) United States Patent
Hole

(10) Patent No.: US 8,897,190 B2
(45) Date of Patent: *Nov. 25, 2014

(54) SYSTEM AND METHOD FOR DYNAMIC TIMESLOT REDUCTION

(71) Applicant: BlackBerry Limited, Waterloo (CA)

(72) Inventor: David P. Hole, Southhampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,423

(22) Filed: Feb. 13, 2013

(65) Prior Publication Data

US 2013/0294254 A1 Nov. 7, 2013

Related U.S. Application Data

(63) Continuation of application No. 12/862,451, filed on Aug. 24, 2010, now Pat. No. 8,385,244.

(51) Int. Cl.
*G08C 17/00* (2006.01)
*H04J 3/16* (2006.01)
*H04L 1/18* (2006.01)
*H04L 1/16* (2006.01)
*H04W 24/02* (2009.01)
*H04W 52/02* (2009.01)

(52) U.S. Cl.
CPC ............ *H04W 24/02* (2013.01); *H04L 1/1896* (2013.01); *H04L 1/1685* (2013.01); *H04L 1/1887* (2013.01); *H04W 52/0216* (2013.01)
USPC .......................................... 370/311; 370/346

(58) Field of Classification Search
USPC ......... 370/311, 328, 338, 345, 346, 437, 449, 370/458, 459, 468
See application file for complete search history.

(56) References Cited

U.S. PATENT DOCUMENTS

| 6,157,632 A | 12/2000 | Cudak et al. | |
| 6,339,713 B1* | 1/2002 | Hansson et al. | 455/574 |
| 6,694,348 B1* | 2/2004 | Mizuhara | 709/201 |
| 7,870,588 B2* | 1/2011 | Guo | 725/62 |
| 8,208,973 B2* | 6/2012 | Mehta | 455/574 |
| 2004/0253996 A1* | 12/2004 | Chen et al. | 455/574 |

FOREIGN PATENT DOCUMENTS

| EP | 1229748 A1 | 8/2002 |
| WO | 2006130741 A1 | 12/2006 |

OTHER PUBLICATIONS

Nokia Corporation, Nokia Siemens Networks, Dynamic Timeslot Reduction, 3GPP TSG GERAN#41, Tdoc G2-090266, Valetta, MALTA, Feb. 16-20, 2009.
PCT International Search Report and Written Opinion, PCT/EP2011/064580, Nov. 9, 2011.

* cited by examiner

*Primary Examiner* — Hong Cho
(74) *Attorney, Agent, or Firm* — Quarles & Brady LLP

(57) ABSTRACT

A method for communicating with a mobile station is presented. The method includes transmitting a first radio block to the mobile station. The first radio block including an indication instructing the mobile station to enter a DTR mode. Before receiving an indication of whether the mobile station is in DTR mode, the method includes retransmitting to the mobile station at least one of the first radio block and a radio block previously transmitted to the mobile station using a timeslot that is not monitored by the mobile station when the mobile station is in the DTR mode.

20 Claims, 8 Drawing Sheets

|   |   |   | Bit |   |   |   |   |
|---|---|---|---|---|---|---|---|
|   |   |   | 2 | 1 |   |   |   |
|   |   |   | FBI | E |   |   |   |

| Bit | | | | | | | | |
|---|---|---|---|---|---|---|---|---|
| 8 | 7 | 6 | 5 | 4 | 3 | 2 | 1 | |
| Length indicator | | | | | | | E | Octet 1 (note) (optional) |
| . | | | | | | | | . |
| Length indicator | | | | | | | E | Octet M (optional) |
| | | | | | | | | Octet M+1 |
| RLC data | | | | | | | | . |
| | | | | | | | | Octet K-1 |
| spare | | DTR Blks | | CI | | TN/PDCH-pair | | Octet K (optional) |
| | | | | | | | | . |
| | | | | | | | | Octet N2-1 |
| | | | | | | | | Octet N2 |

FIG. 8

SYSTEM AND METHOD FOR DYNAMIC TIMESLOT REDUCTION

This application is based on, incorporates herein by reference, and claims the benefit of U.S. application Ser. No. 12/862,451, filed on Aug. 24, 2010, and entitled, "SYSTEM AND METHOD FOR DYNAMIC TIMESLOT REDUCTION."

BACKGROUND

The present disclosure relates generally to data transmission protocols in mobile communication systems and, more specifically, to systems and methods for dynamic timeslot reduction (DTR) in a communication system.

As used herein, the terms "mobile station" (MS), "user agent," and "user equipment" (UE) can refer to electronic devices such as mobile telephones, personal digital assistants (PDAs), handheld or laptop computers, and similar devices that have network communications capabilities. In some configurations, MS may refer to a mobile, wireless device. The terms may also refer to devices that have similar capabilities but that are not readily transportable, such as desktop computers, set-top boxes, or network nodes.

An MS may operate in a wireless communication network that provides for data communications. For example, the MS may operate in accordance with Global System for Mobile Communications (GSM) and General Packet Radio Service (GPRS) technologies. Today, such an MS may further operate in accordance with Enhanced Data rates for GSM Evolution (EDGE), Enhanced GPRS (EGPRS), Enhanced GPRS Phase 2 (EGPRS2), or GSM EDGE Radio Access Network (GERAN).

To communicate with a network, an MS is configured to use a media access control (MAC) protocol to determine the uplink (UL) and/or downlink (DL) communication resources available for use by the MS. GPRS, for example, uses a timeslot structure similar to that of GSM, but where timeslots are dynamically allocated to MSs both for uplink and downlink transmissions. To communicate with a GPRS network, therefore, an MS may be configured to have a multi-slot capability that enables the MS to use between one (1) and eight (8) timeslots per carrier for data transfer between the MS and network. Because uplink and downlink channels are reserved separately, various multi-slot resource configurations may be assigned in different directions in different communications networks.

In some cases, an MS may be allocated timeslots on dual carriers. A dual carrier 'assignment' comprises a set of timeslots assigned on two carriers. In the case of an uplink dual carrier assignment, the assignment includes the total set of timeslots on both carriers that may be used by the MS for uplink transmissions; in the case of a downlink dual carrier assignment, the assignment is the total set of timeslots on both carriers upon which the network may send data to the MS.

For any given radio block period, the network dynamically allocates resources and determines upon which downlink timeslots or uplink timeslots the MS may receive and/or transmit data. In basic transmission time intervals (BTTI), a given radio block period can include 4 TDMA frames with each TDMA frame including 8 timeslots. The allocation algorithm may be implementation dependent, but may take account of the MS's multislot class (the maximum number of timeslots on which the MS can transmit or receive, and the time required to switch from transmit to receive and vice versa), and may take account of the amount of data the network (e.g., a base station controller (BSC)) expects the MS to receive or transmit.

In some cases, reduced transmission time intervals (RTTI) are used to communication with an MS. RTTI are a modification to the above structure where, instead of a radio block being transmitted as four bursts with each block being sent in a particular timeslot over four TDMA frames, a radio block (containing essentially the same amount of information) is transmitted using two timeslots in two TDMA frames. This reduces the transmission time for a block and reduces the overall latency of the system. Accordingly, a "reduced radio block period" can be 2 TDMA frames (approximately 10 ms) compared with a basic radio block period, which can be 4 TDMA frames (approximately 20 ms).

In EGPRS systems, a radio block containing RLC data comprises a header and one or more RLC data blocks. The header (which is relatively robustly encoded) may be successfully decoded independent of the failure or success of decoding the one or more RLC data blocks. The header indicates the sequence number(s) of the RLC data blocks and (for downlink blocks) indicates the identity of the intended recipient MS. Provided that the header was decoded correctly, each of the RLC data blocks may be either successfully or unsuccessfully decoded. For example, in attempting to decode a radio block containing 2 RLC data blocks, an MS may decode the header and one of the RLC data blocks successfully, but may fail to decode the other RLC data block.

In a network, uplink allocations can be signaled to an MS using an uplink state flag (USF), which is a number between 0 and 7 (inclusive) that is signaled in downlink radio blocks. As part of the MS's uplink assignment, the MS is informed of which USF(s) on which timeslot(s) indicate an uplink allocation for that MS. USFs are generally included in the headers of downlink blocks. In the case of RTTI, USFs may be coded across radio blocks across four TDMA frames, for example, in the same manner as downlink BTTI radio blocks are sent (e.g., "BTTI USF mode") or (using two timeslots) across two TDMA frames (e.g., "RTTI USF mode").

In some communication standards, there are "m" timeslots assigned for reception and "n" timeslots assigned for transmission. Thus, for a multislot class type 1 MS, there may be Min(m,n,2) reception and transmission timeslots with the same timeslot number. For a multislot class type 2 MS, there may be Min(m,n) reception and transmission timeslots with the same timeslot number. In the case of downlink dual carrier configurations, if timeslots with the same timeslot number are assigned on both channels, in calculating the value of m they may be counted as one timeslot. As a result, where both downlink and uplink timeslots are assigned, if assigned a single timeslot in one direction and one or more timeslots in the opposite direction, the timeslot number of the first timeslot may be the same as one of the timeslot(s) in the opposite direction. Similarly, if assigned two or more uplink timeslots and two or more downlink timeslots, at least two of the uplink and downlink timeslots may have a common timeslot number. As a result, in uplink+downlink assignments, the timeslots that may be monitored for USFs and downlink data blocks may be largely co-incident. In some networks, assignments and allocations are essentially under the control of the network (for example, the BSC).

During an ongoing packet data session, for example, an MS with an assigned downlink TBF (temporary block flow) can be required to monitor all downlink timeslots in the MS's assignment in case the network sends the MS data in any of the allocated downlink timeslots. Similarly, if an MS has an assigned uplink TBF, the MS may be required to monitor all timeslots on which the USF (uplink state flag) could be sent to dynamically allocate uplink resources. If an MS has both uplink and downlink TBFs, therefore, the MS must monitor as many relevant downlink timeslots as possible, taking into account any allocated uplink transmissions opportunities.

In the case that either the network or the MS has no data to send, and particularly when neither the network nor the MS has data to transmit, this monitoring activity results in significant wasted battery power in the MS. To minimize battery power consumption, the assigned resources (e.g., TBF) may be maintained, while the number of timeslots that the MS must monitor is reduced. This reduction in the number of timeslots being monitored can be referred to as DTR; an MS applying such a reduction can be referred to as being "in DTR" or "in DTR mode".

Using DTR, an MS (for example an MS operating in packet transfer mode (i.e. with assigned packet resources)) can reduce its battery consumption by reducing the set of timeslots that the MS monitors for downlink data and/or uplink allocations (as indicated by uplink state flags (USFs)). The MS may monitor only a single timeslot or, in RTTI, a single pair of timeslots per radio block period. As a result, the network may only transmit new data or USFs on timeslots that are actually monitored by the MS. Generally, for an MS in DTR, the transmission or reception of any new data (generally not retransmissions of previously transmitted data) causes the MS to leave DTR mode.

In various network configurations, there can be two particular mechanisms by which a network can cause an MS to enter DTR mode: option 1—by transmitting a PACKET UPLINK ACK/NACK (PUAN) control message containing DTR information to the MS, or option 2—by means of DTR information included within a Radio Link Control (RLC) data block transmitted to the MS.

In option 1, when a PUAN is used to instruct the MS to enter DTR, one of the conditions that should be met before the MS enters DTR is that no data block has been transmitted or received in the previous (max(BS_CV_MAX, 1)−1) block periods. Here, BS_CV_MAX may be a value indicative of the round trip time for data packets (e.g., packets sent on a Physical Downlink Channel (PDCH) or Packet Associated Control Channel (PACCH)) between the network (or that part of the network that processes data packets) and the MS. The value is made available by the network for use by connected MSs and may be broadcast in system information (SI), for example. A typical value of BS_CV_MAX is 6, corresponding to 6 radio block periods, or approximately 120 ms, for example.

BS_CV_MAX is a useful value as the MS can use the round trip time to determine whether Negative Acknowledgement (NACK) messages received from the network can safely be ignored. If, for example, a NACK that refers to a block that was very recently transmitted to the network by the MS is received from the network, the MS can use BS_CV_MAX to determine whether the NACK refers to the most recently transmitted block, or to a duplicate of the block that was transmitted earlier (such as when an MS retransmits a block to the network). If the most recent transmission of the block took place less than one round-trip time (i.e., BS_CV_MAX radio block periods) prior to reception of the NACK, then the NACK cannot refer to the most recently transmitted block because the network must have transmitted the NACK prior to receiving the most recent block (the NACK cannot be received in less time than BS_CV_MAX). Therefore, the NACK does not refer to the block that was most recently transmitted by the MS and the MS may choose to ignore the NACK because the network could have safely received the most recent transmission, which would make the NACK moot.

Generally, in the first option for causing the MS to enter DTR, the condition that no data block has been transmitted or received in the previous (max(BS_CV_MAX, 1)−1) block periods must be met at the time when the PUAN is received; if not, the DTR Information in the PUAN is ignored and the MS will not enter DTR.

In the second option, when using DTR information included within an RLC data block to cause the MS to enter DTR, the conditions for the MS entering DTR are 1) that any received poll has been responded to, 2) that V(R)=V(Q), and 3) that the block with sequence number V(R)−1 contain DTR information.

In this option, the parameters V(R), V(Q), V(N) relate to the RLC receive window in the MS that is associated with RLC data blocks. V(N) refers to an array of elements, each of which can take the value INVALID or RECEIVED. V(R) identifies the block sequence number (BSN) of the next expected block (i.e. one more than the highest BSN that has been seen or, in some cases, one higher than the highest BSN whose corresponding data block has been received correctly). V(Q) refers to the lowest BSN identifying a block that has not yet been received correctly. As such, when V(R)=V(Q), the next expected block is also the only one that has not yet been received correctly, meaning that all blocks with lower BSNs have been received correctly. As an example, in a particular block sequence, if an MS has received blocks 1, 2, 3, 4, 5, 9, and 12 of the sequence correctly, V(R)=13 (the next higher BSN after 12), and V(Q)=6 (the lowest BSN of a block that was not received correctly). Alternatively, if an MS has received blocks 1, 2, 3, 4, and 5 correctly, but block 6 was received with errors, V(R)=7 and V(Q)=6. Finally, if an MS has received blocks 1, 2, 3, 4, 5, and 6 correctly, then V(R)=V(Q)=7 (i.e., all blocks 1-6 have been received correctly).

When using DTR information included within a RLC data block to cause the MS to enter DTR, it may not be necessary that all three conditions be satisfied in any particular order. For example, an MS may first receive blocks 1, 2, 3, and 4, then receive block 7 containing DTR information, and then later receive blocks 5, and 6 (e.g. in response to a request for retransmission). At that end of that sequence, even though all blocks were not received in order and all conditions were not satisfied in order, the MS will enter DTR because V(Q)=V(R)=8, and the block with BSN=V(R)−1 (i.e. 7) contained DTR information (presuming the MS has responded to any pending polls).

Note that if the network should subsequently receive an acknowledgement of all blocks up to and including block 7 from the MS, the network can determine that the MS has entered DTR. To trigger such an acknowledgement, the network may poll the MS—polls are indicated by settings of bits (such as in the relative reserved block period (RRBP)/combined EGPRS supplementary polling (CESP) fields) in the header of radio blocks.

When using DTR information included within a RLC data block to cause the MS to enter DTR, FIG. 8 illustrates an example EGPRS downlink RLC data block for instructing an MS to enter DTR.

Referring to FIG. 8, the carrier ID (CI) field contains a identification of the carrier that may be encoded as DTR_CI IE. The CI field can be used to indicate the carrier that the MS monitors when DTR is used. In that case, the timeslot or PDCH-pair to monitor on that carrier can be indicated with the TN/PDCH-pair field. The TN/PDCH-pair field may contain the timeslot number (BTTI configuration) or the PDCH-pair number (RTTI configuration) the MS monitors on the indicated carrier (CI field) when DTR is implemented. Finally, the DTR Blks field may indicate a subset of downlink radio blocks during which the MS monitors for USFs and/or downlink RLC data blocks when in DTR mode. In some cases, when causing an MS to enter DTR, in both options 1 and 2 described above, there may be a maximum reaction period permitted between the conditions for an MS to enter DTR being satisfied and the MS actually entering DTR.

Unfortunately, in many implementations, DTR is asynchronous. As a result, the network and the MS may have different beliefs of whether the MS is in DTR. This may result in less efficient communications between the network and the MS where, as an example the network falsely believes the MS is in DTR and, as a result, fails to use the full number of available resources for communications with the MS. Similarly, for example, if the MS is not in DTR, but the network believes the MS is in DTR, the MS may be listening for communications on resources (i.e., timeslots) that the network believes are not available for communications to the MS. Although a mechanism exists (by means of polling and receiving the poll response) for the network to determine the status of the MS, this is subject to round-trip delays (including transmission time, propagation delays, processing delays etc.), and may unnecessarily delay a mobile entering DTR.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is an illustration showing an example EGPRS downlink RLC data block for instructing an MS to enter DTR.

DETAILED DESCRIPTION

Figure 1:
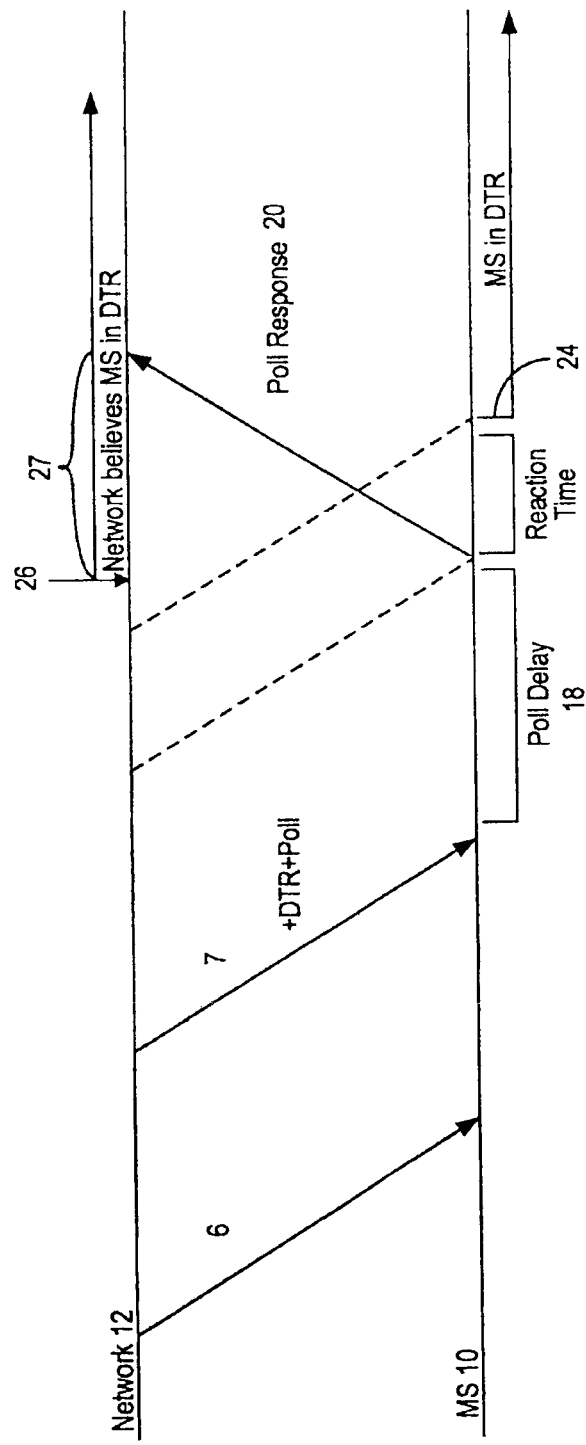
FIG. 1 is a sequence diagram of network communications wherein the network believes the MS has entered DTR before the network receives actual confirmation that the MS is in DTR.

The present disclosure relates generally to data transmission protocols in mobile communication systems and, more specifically, to systems and methods for dynamic timeslot reduction (DTR) in a communication system.

One embodiment includes a method for communicating with a mobile station. The method includes transmitting a first radio block to the mobile station, the first radio block includes an indication instructing the mobile station to enter a DTR mode. The method includes, before receiving an indication of whether the mobile station is in DTR mode, retransmitting to the mobile station at least one of the first radio block and a radio block previously transmitted to the mobile station using a timeslot that is not monitored by the mobile station when the mobile station is in the DTR mode.

Another embodiment includes a method for communicating with a mobile station. The method includes transmitting a first radio block to the mobile station. The first radio block includes an indication instructing the mobile station to enter a DTR mode. The method includes, before determining that the mobile station is in DTR mode, transmitting a poll message to the mobile station using a timeslot that is not monitored by the mobile station when the mobile station is in the DTR mode.

Another embodiment includes a method for communicating with a network. The method includes receiving a first radio block. The first radio block includes an indication instructing a mobile station to enter a DTR mode and having a block sequence number. The method includes after receiving the first radio block, receiving a poll message, and, when all radio blocks having block sequence numbers less than or equal to the block sequence number of the first radio block have been successfully received from the network, ignoring the poll message, and entering the DTR mode.

Another embodiment includes a network component comprising a processor configured to transmit a first radio block to a mobile station. The first radio block includes an indication instructing the mobile station to enter a DTR mode. The processor is configured to, before receiving an indication of whether the mobile station is in DTR mode, retransmit to the mobile station at least one of the first radio block and a radio block previously transmitted to the mobile station using a timeslot that is not monitored by the mobile station when the mobile station is in the DTR mode.

Another embodiment includes a mobile station comprising a processor configured to receive a first radio block. The first radio block includes an indication instructing the mobile station to enter a DTR mode and having a block sequence number. After receiving the first radio block, the processor is configured to receive a poll message, and, when all radio blocks having block sequence numbers less than or equal to the block sequence number of the first radio block have been successfully received from a network, ignore the poll message, and enter the DTR mode.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, channel, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In many network implementations, DTR is asynchronous between the MS and network. This may be, for example, because the network has received no indication of DTR status from the MS and/or due to propagation delays, and/or transmission time delays, and/or because of the possibility that messages transmitted by the network may not be decoded correctly by the MS and vice versa. As a result, the network may have uncertainty over whether the MS is operating in DTR even after the network transmits instructions to the MS to enter DTR (i.e., to monitor a reduced set of timeslots). After instructing the MS to enter DTR, for example, if one or more of the conditions required for the MS to enter DTR are not met, the MS will not enter DTR, even if the network believes the MS has entered DTR. Also, because there is some delay in the transmission of messages between the network and MS, the network may have to wait some time for confirmation that the MS has or has not entered DTR. While the network waits for that confirmation, the network is uncertain as to whether the MS has actually entered DTR. In some cases, the network is expected to behave as if the MS has actually entered DTR, since, in regards to at least some aspects of the network's behavior (such as transmission of new data), this assumption must be made. As an example, FIG. 1 is a sequence diagram of network communications wherein network 12 believes MS 10 has entered DTR before network 12 receives actual confirmation that MS 10 is in DTR.

In the sequence diagrams of the present disclosure, the radio block transmissions are shown as arrows passing between MS 10 and network 12 and time passes from left to right. As such, moving from left to right in each diagram, the arrows represent sequential communications of radio blocks between MS 10 and network 12. In the present disclosure, it is assumed, though not required, that the block containing the DTR Information (instructing the MS to enter DTR) will also contain a poll request.

In FIG. 1, network 12 transmits a block having BSN 6 to MS 10, which is successfully received by MS 10. (Note: in the present disclosure, blocks having a BSN of N are referred to as block N.) Network 12 may include any appropriate network component, such as a component of a wireless communications network configured to communicate with an MS.

After successfully receiving block 6 from network 12, MS 10 receives block 7. In FIG. 1, block 7 contains DTR Information and a poll request. Accordingly, by transmitting block 7, network 12 instructs MS 10 to enter DTR and also polls MS 10 for packet downlink ACK/NACK (PDAN) information.

After poll delay 18 (e.g., the delay between receiving the poll and the uplink block identified by the poll that is allocated for the poll response), MS 10 transmits poll response 20 to network 12. In this example, poll response 20 informs network 12 that MS 10 has successfully received both blocks 6 and 7. After some further short reaction time delay 22 (which may or may not be present in all MS implementations), MS 10 enters DTR at the time indicated by element 24.

At some time during this process, after transmitting block 7, network 12 makes the determination that MS 10 has received the DTR Information and is in DTR. In this example, network 12 presumes MS 10 has entered DTR at a time equal to TXtime(7)+poll delay 18 (typically 1-2 block periods) after the transmission of block 7, where TXtime(7) is the transmission time of block 7 from network 12 to MS 10 (as shown in FIG. 1). In some cases, the network may presume an additional delay or reaction time during which the MS switches to DTR. As such, network 12 believes MS 10 is in DTR at time 26, sometime before network 10 receives poll response 20 which confirms whether or not all blocks were successfully received by the MS (i.e., V(R)=V(Q)) and therefore whether the MS actually did enter DTR at the time presumed by the network. Accordingly, after transmitting block 7 and before receiving poll response 20, the network has some uncertainty regarding whether MS 10 actually entered DTR at time 26. Because the round-trip time (RTT) between MS 10 and network 12 is typically 6 block periods, in some implementations the "uncertainty" window may be approximately 4 block periods or approximately 80 ms (the amount of time between MS 10 receiving the poll included in block 7, and the time at which network 12 can expect to receive MS 10's response to the poll message). On FIG. 1, the uncertainty window is indicated by element 27 corresponding to the case where the reaction time is a fixed value (if the reaction time is a maximum value, the uncertainty window 27 extends prior to 26).

When network 12 believes MS 10 to be in DTR and behaving accordingly (at least in respect of transmission of new data), this is referred to in the present disclosure as network 12 being in DTR (i.e., the network performs as if the MS is in DTR). When in DTR, the network transmits any new data to MS 10 (e.g., block 8, or USFs) using timeslots that are monitored by MS 10 during DTR so that the new data can be received by MS 10.

Figure 2:
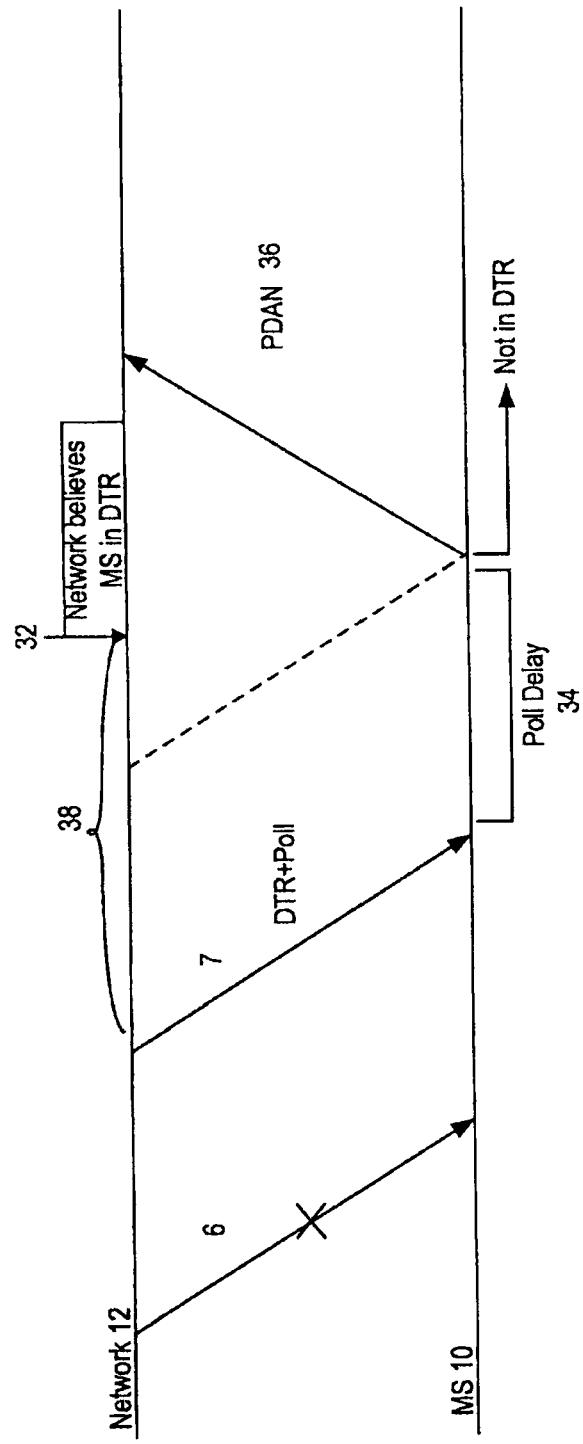
FIG. 2 is a sequence diagram showing network communications where the MS fails to enter DTR due to the unsuccessful receipt of a block from the network.

In some cases, however, the MS will not enter DTR when instructed because one or more radio block was not successfully received from the network and, as a result, V(R) !=V(Q) at the time the MS attempts to enter DTR. As an example of this, FIG. 2 is a sequence diagram showing network communications where MS 10 fails to enter DTR due to the unsuccessful receipt of a block from network 12. In FIG. 2, network 12 first attempts to transmit block 6 to MS 10, but the transmission is unsuccessful (e.g., block 6 does not reach MS 10, or MS 10 decodes block 6 with errors). Network 12 then transmits block 7 to MS 10. Block 7 includes DTR Information that instructs MS 10 to enter DTR as well as a poll request. Sometime after transmitting block 7 (see element 32 on FIG. 2), network 12 presumes that MS 10 has entered DTR. At this time, however, network 12 is unaware that MS 10 did not successfully receive block 6.

After MS 10 receives block 7, however, because MS 10 has not successfully received block 6 (i.e., V(R)=8 and V(Q)=6)

the necessary conditions for entering DTR have not been satisfied and MS 10 will not enter DTR, even though MS 10 received DTR Information from network 12 in block 7. Accordingly, after poll delay 34, MS 10 transmits PDAN 36 to network 12 informing network 12 that MS 10 did not successfully receive block 6. After receiving PDAN 36, network 12 knows that block 6 was not successfully received and that MS 10 did not enter DTR at the time network 12 presumed MS 10 did (e.g., time 32). Accordingly, between the sending of block 7 plus a reasonable transmission time delay 38 (e.g., TXtime(7)+poll delay 34 (typically 1-2 block periods)) and receipt of PDAN 36, network 12 presumes that MS 10 is operating in DTR when, in fact, it isn't.

In the example shown in FIG. 2, therefore, in order for MS 10 to enter DTR, after receiving PDAN 36, network 12 must retransmit block 6. After block 6 is successfully transmitted to MS 10, MS 10 can then enter DTR.

In at least one embodiment of the present disclosure, however, the network behavior minimizes the delay that occurs before the MS enters DTR should the MS fail to successfully receive one or more blocks from the network. The present disclosure also describes mechanisms that allow the network to confirm whether the MS has entered DTR, without requiring excessive transmissions (e.g., poll responses) from the mobile station using polling messages.

After transmitting a block to an MS that instructs the MS to enter DTR (e.g., block 7 of FIG. 3), the network is configured to retransmit one or more of the previously transmitted blocks using non-DTR timeslots. This retransmission may be autonomous (or "pre-emptive"), i.e. without having received an indication from the MS that the previously transmitted blocks were not correctly received by the MS. Because there is a chance that one or more of the blocks may not have successfully been received by the MS (though the network wouldn't know until it receives a PDAN from the MS), by retransmitting the blocks pre-emptively there is a chance that the network is providing the MS with needed data blocks. For example, if the MS in fact failed to receive one or more blocks transmitted by the network before the instruction to enter DTR (and possibly the block containing the DTR Information) (see, for example, the sequence of FIG. 2), the MS will not have entered DTR, and will be monitoring all assigned timeslots (or timeslots to be monitored in accordance with the MS's assignment). The MS may, in addition, request retransmission of the missing blocks. As such, the MS is in a condition that allows it to receive blocks that were retransmitted by the network using the non-DTR timeslots. Upon successfully receiving all the blocks, if the retransmitted blocks were needed by the MS, the MS can enter DTR.

If, however, the MS did receive all blocks successfully and entered DTR after receiving the DTR instruction from the network, the MS will be unaware of the retransmissions from the network. Because the blocks are retransmitted using non-DTR timeslots, the MS can ignore the retransmitted blocks and may not see or receive the retransmissions.

The network may order the MS into DTR by, for example, using DTR Information incorporated into an RLC data block transmitted to the MS or transmitting a PUAN control message containing DTR information, or using any other appropriate mechanism. The network then uses a combination of retransmissions of particular blocks and poll requests using non-DTR timeslots (and, optionally, DTR timeslots) to minimize the delay in the MS entering DTR (if the MS has not already done so). Only MSs which have not yet entered DTR (because they have not yet correctly received all downlink data blocks) respond to polls or process the block retransmissions.

In at least one embodiment of the present disclosure, if the network polls on a non-DTR timeslot, the network can be configured to treat the absence of a response to a poll from a particular MS as confirmation that the MS has entered DTR (which correspondingly implies that the conditions for DTR entry have been met, including that $V(R)=V(Q)$) because otherwise the MS would have received and responded to the poll.

In some embodiments, the MS is configured to not respond to a poll received from the network if the MS has already met all criteria for entering DTR, except for transmitting a response to a previous poll and/or while a reaction time limit for entering DTR (having met all other criteria) has not expired. This behavior allows the network to poll with high frequency (so the network can determine whether the MS has entered DTR quickly) without requiring the MS to respond to every poll, which would otherwise delay the MS's entry to DTR unnecessarily. In some other embodiments the MS is configured to respond to at most one poll received from the network after (or substantially at the same time as) the MS has met all criteria for entering DTR, except for transmitting a response to a previous poll and/or while a reaction time limit for entering DTR (having met all other criteria) has not expired. In some other embodiments the MS is configured to send at most one poll response, the contents of which indicate to the network that the MS has received the necessary data blocks required to allow it to enter DTR. In some of these embodiments any restriction on responding to a poll may be removed once the MS enters DTR mode or determines that the (previously-met) conditions for entering DTR mode are no longer satisfied.

Figure 3:
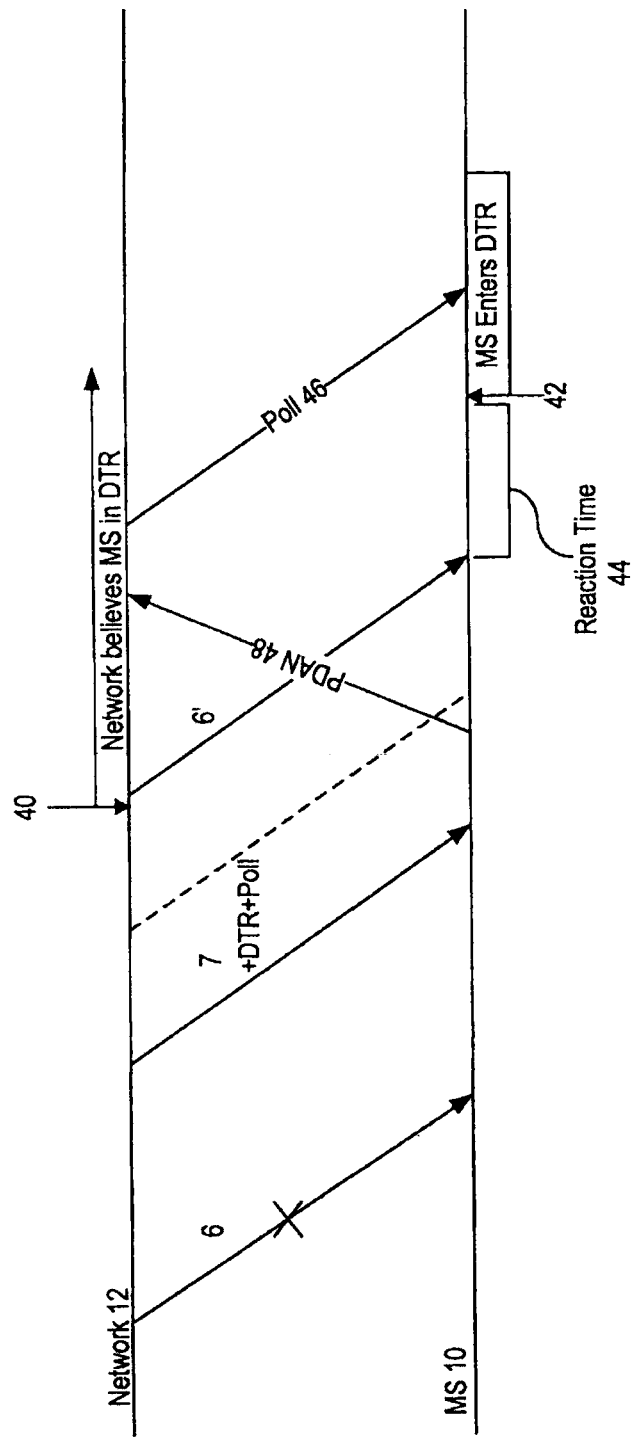
FIG. 3 is a sequence diagram illustrating retransmission of blocks by the network to allow the MS to enter DTR.

For example, FIG. 3 is a sequence diagram illustrating the retransmission of blocks by the network to allow the MS to enter DTR. As shown in FIG. 3, network 12 first transmits block 6 to MS 10, but MS 10 does not successfully receive block 6. After transmitting block 6, network 12 transmits block 7 which includes DTR Information and a poll request. Accordingly, block 7 includes an instruction for MS 10 to enter DTR.

After transmitting block 7, at time 40, network 12 believes MS 10 has entered DTR. However, because MS 10 did not successfully receive block 6, $V(R) \ne V(Q)$ for the MS, and, therefore, the required conditions have not been met to allow MS 10 to enter DTR. Accordingly, at time 40, although network 12 may believe that MS 10 has entered DTR, network 12 cannot be certain—it does not know whether both blocks 6 and 7 were successfully received by MS 10.

Accordingly, after transmitting block 7, network 12 is configured to pre-emptively retransmit one or more of the recently transmitted blocks to MS 10 in case they were not successfully received by MS 10. With reference to FIG. 3, network 12 pre-emptively retransmits block 6 to MS 10 as block 6'. Depending upon the implementation, however, network 12 may be configured to pre-emptively retransmit any combination of the previously transmitted blocks to MS 10. Accordingly, with reference to FIG. 3, network 12 may pre-emptively retransmit block 6 (see block 6'), blocks 6 and 7, or only block 7—any combination of previously transmitted blocks may be used. In some cases, the retransmitted block is one or more of the blocks that were transmitted immediately before the DTR instruction. By retransmitting the blocks, network 12 acts to provide MS 10 with any missing (or unsuccessfully received) blocks as soon as possible, without waiting for the receipt of a NACK transmission from MS 10. After all blocks have been successfully received by MS 10, $V(R)=V(Q)$ and MS 10 can enter DTR.

If network 12 were not to retransmit block 6' as shown in FIG. 3, network would otherwise have to wait to receive and process MS 10's response to the poll included in block 7, shown on FIG. 3 as PDAN 48 (i.e., a NACK transmission) before retransmitting block 6. If network 12 were to wait to receive PDAN 48, the retransmission of block 6 would therefore be delayed. In the present implementation, even though network 12 receives PDAN 48 indicating that MS 10 did not receive block 6, network 12 knows that it has already retransmitted block 6 to MS 10 and the a third transmission may not be necessary. Alternatively, network 12 could retransmit block 6 for a third time using a non-DTR timeslot.

In some implementations, when retransmitting block 6', network 12 only uses timeslots that are not monitored by MS 10 when MS 10 is in DTR (i.e., non-DTR timeslots). If block 6' were retransmitted on a DTR timeslot, the block would be received and at least some portions of it (for example, the portion identifying the BSN) may be processed by MS 10 even it were operating in DTR, resulting in unnecessary consumption of resources on MS 10. For example, if blocks 6 and 7 shown in FIG. 3 had both been successfully received by MS 10, MS 10 would have entered DTR following receipt of block 7. If network 12 were to perform the pre-emptive retransmission of block 6, block 7, or blocks 6 and 7 on timeslots that are monitored by MS 10 when in DTR, even after entering DTR MS 10 would receive and process each of the retransmitted blocks. Accordingly, in order to avoid accidentally consuming resources and battery power of an MS 10 that did successfully receive both blocks 6 and 7 and entered DTR, network 12 may be configured to avoid retransmission on timeslots that would be monitored by MS 10 if it were in DTR (e.g., send retransmitted data blocks only on non-DTR monitored timeslots)

After receiving block 6' successfully, MS 10 enters DTR at point 42 after reaction time 44 because MS 10 has now successfully received both blocks 6 and 7 and the conditions necessary for MS 10 to enter DTR have been satisfied.

After retransmitting block 6 as block 6' using a non-DTR monitored timeslot, network 12 transmits polling message 46 again using a non-DTR monitored timeslot. Here, because MS 10 successfully received block 6' and entered DTR, MS 10 is not monitoring non-DTR timeslots and will not receive poll 46 and will not respond. The failure of MS 10 to respond to poll message 46 which was transmitted on a non-DTR monitored timeslot is, therefore, an implicit acknowledgement by MS 10 that V(R)=V(Q) and that MS 10 has entered DTR.

If, however, MS 10 had not successfully received block 6', MS 10 would not have entered DTR and would, therefore, receive and respond to poll 46. In that case, MS 10's response to poll 46 would indicate to network 12 that MS 10 has not successfully received all blocks and that some blocks must be retransmitted.

In some system implementations, an MS cannot enter DTR if there are pending polls to which the MS should respond. Accordingly, in some cases, the transmission of a poll to an MS can delay that MS entering DTR, even when the MS has successfully received all necessary radio blocks. To ensure that the MS enters DTR as quickly as possible, the MS may be configured to not respond to a poll received from the network if the other criteria for entering DTR have been satisfied.

For example, if, at a first time an MS had not successfully received all blocks from the network (i.e., V(R) !=V(Q)), the MS would respond to polls or other messages received from the network on non-DTR-monitored timeslots. However, if at a later time the MS successfully receives the missing blocks (for example, as a result of pre-emptive retransmissions by the network, as shown in FIG. 3) the MS enters DTR after the missing blocks are received and ignores subsequent transmissions (such as a poll) received on non-DTR-monitored timeslots.

This MS behavior allows the network to poll with relatively high frequency (so that the network can quickly determine whether the MS has entered DTR, which can be indicated by the lack of a poll response) without requiring the MS to respond to every poll which would delay MS entry to DTR unnecessarily.

Accordingly, in one implementation, an MS not in DTR mode, but for which all conditions for entering DTR have been met except the reaction time delay and/or transmitting a response to a poll need not respond to a poll received on a timeslot which the MS would not have monitored were the MS operating in DTR.

Furthermore, in implementations of the present disclosure, the network may be configured so that, pre-emptive retransmissions of a network or transmitter of a network are optional but are permitted including circumstances where the MS may be in DTR (see sub-clause 8.1.8 of 3GPP TS 44.060 v.10.1.0), on timeslots which the MS is not required to monitor when in DTR.

Figure 4:
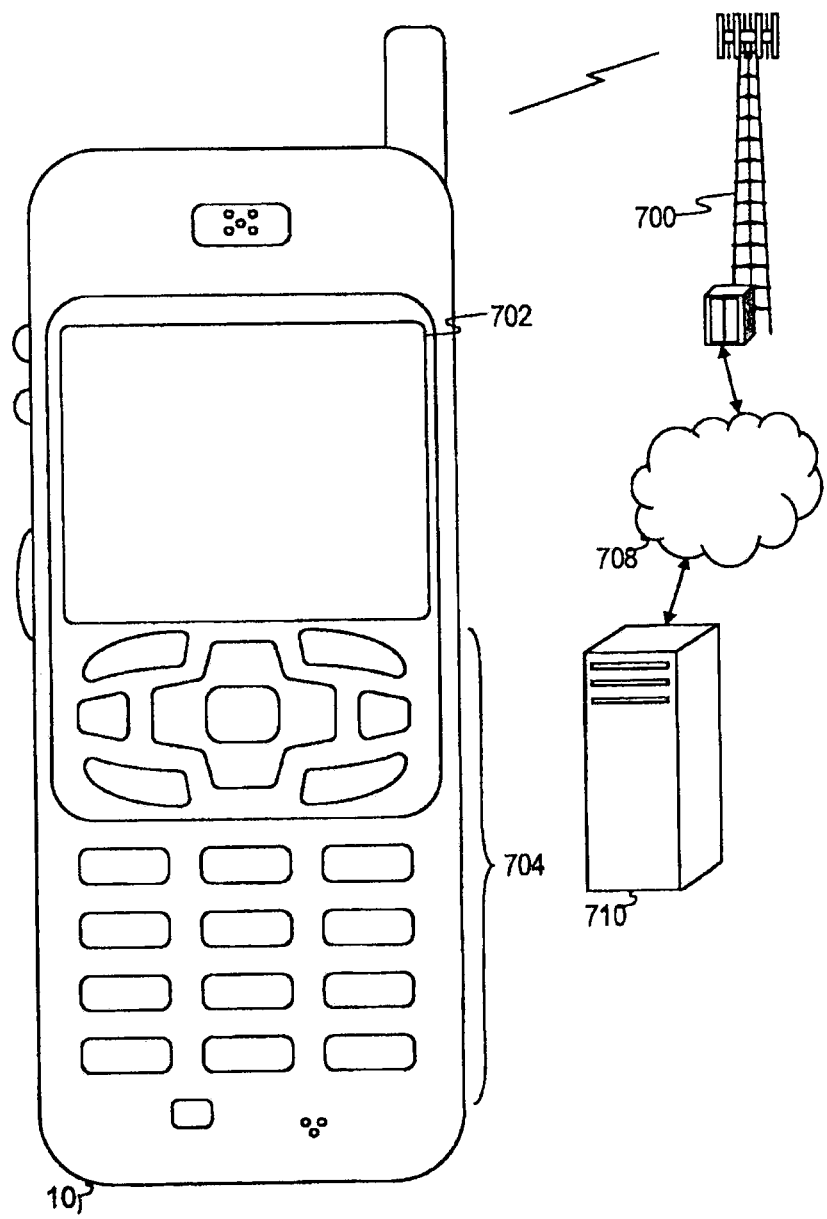
FIG. 4 is a diagram of a wireless communications system including an MS operable for some of the various embodiments of the disclosure.

Referring now to FIG. 4, a wireless communications system including an embodiment of an exemplary MS 10 is illustrated. The MS is operable for implementing aspects of the disclosure, but the disclosure should not be limited to these implementations. Though illustrated as a mobile phone, the MS may take various forms including a wireless handset, a pager, a personal digital assistant (PDA), a portable computer, a tablet computer, a laptop computer, smart phones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the MS 10 is not a general purpose computing device like a portable, laptop or tablet computer, but rather is a special-purpose communications device such as a mobile phone, a wireless handset, a pager, a PDA, or a telecommunications device installed in a vehicle. The MS 10 may also be a device, include a device, or be included in a device that has similar capabilities but that is not transportable, such as a desktop computer, a set-top box, or a network node. The MS 10 may support specialized activities such as gaming, inventory control, job control, and/or task management functions, and so on.

The MS 10 includes a display 702. The MS 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The MS 10 may present options for the user to select, controls for the user to actuate, and/or cursors or other indicators for the user to direct.

The MS 10 may further accept data entry from the user, including numbers to dial or various parameter values for configuring the operation of the MS 10. The MS 10 may further execute one or more software or firmware applications in response to user commands. These applications may configure the MS 10 to perform various customized functions in response to user interaction. Additionally, the MS 10 may be programmed and/or configured over-the-air, for example from a wireless base station, a wireless access point, or a peer MS 10.

Among the various applications executable by the MS 10 is a web browser, which enables the display 702 to show a web page. The web page may be obtained via wireless communications with a wireless network access node, a cell tower, a peer MS 10, or any other wireless communication network or system 700. The network 700 is coupled to a wired network 708, such as the Internet. Via the wireless link and the wired network, the MS 10 has access to information on various servers, such as a server 710. The server 710 may provide content that may be shown on the display 702. Alternately, the MS 10 may access the network 700 through a peer MS 10 acting as an intermediary, in a relay type or hop type of connection.

Figure 5:
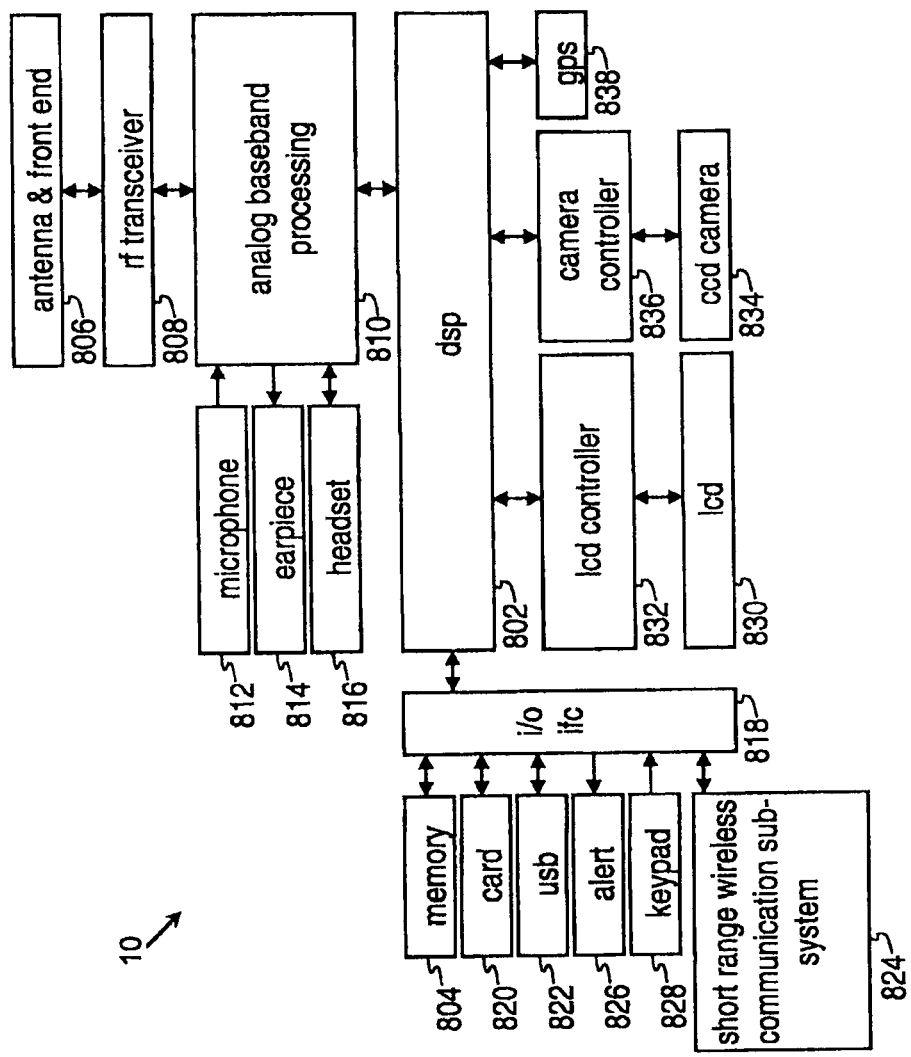
FIG. 5 is a block diagram of an MS operable for some of the various embodiments of the disclosure.

FIG. 5 shows a block diagram of the MS 10. While a variety of known components of UAs 10 are depicted, in an embodiment a subset of the listed components and/or additional components not listed may be included in the MS 10. The MS 10 includes a digital signal processor (DSP) 802 and a memory 804. As shown, the MS 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the MS 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the MS 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the MS 10 to send and receive information from a cellular network or some other available wireless communications network or from a peer MS 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the MS 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the MS 10 and may also enable the MS 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the MS 10 to communicate wirelessly with other nearby mobile devices and/or wireless base stations.

The input/output interface 818 may further connect the DSP 802 to the alert 826 that, when triggered, causes the MS 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific preassigned melody for a particular caller.

The keypad 828 couples to the DSP 802 via the interface 818 to provide one mechanism for the user to make selections, enter information, and otherwise provide input to the MS 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the MS 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the MS 10 to determine its position, Various other peripherals may also be included to provide additional functions, e.g., radio and television reception.

Figure 6:
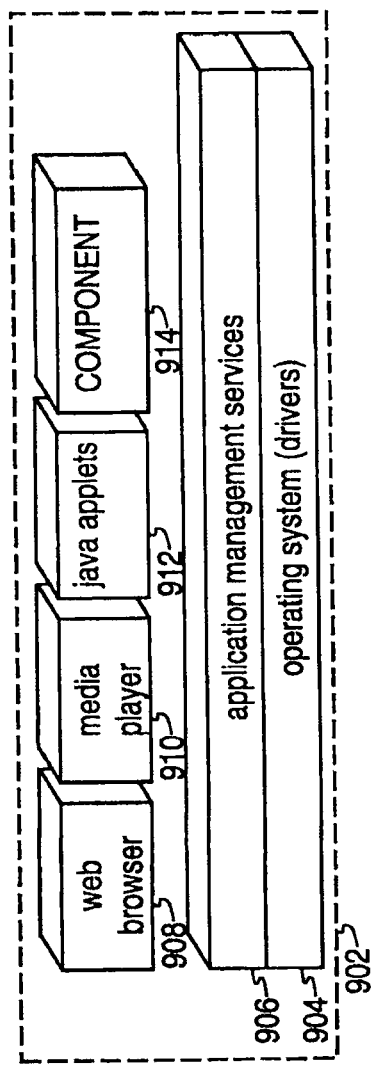
FIG. 6 is a diagram of a software environment that may be implemented on a UE operable for some of the various embodiments of the disclosure.

FIG. 6 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the MS 10. Also shown in the figure are a web browser application 908, a media player application 910, and Java applets 912. The web browser application 908 configures the MS 10 to operate as a web browser, allowing a user to enter information into forms and select links to retrieve and view web pages. The media player application 910 configures the MS 10 to retrieve and play audio or audio-visual media. The Java applets 912 configure the MS 10 to provide games, utilities, and other functionality. A component 914 might provide functionality described herein.

Figure 7:
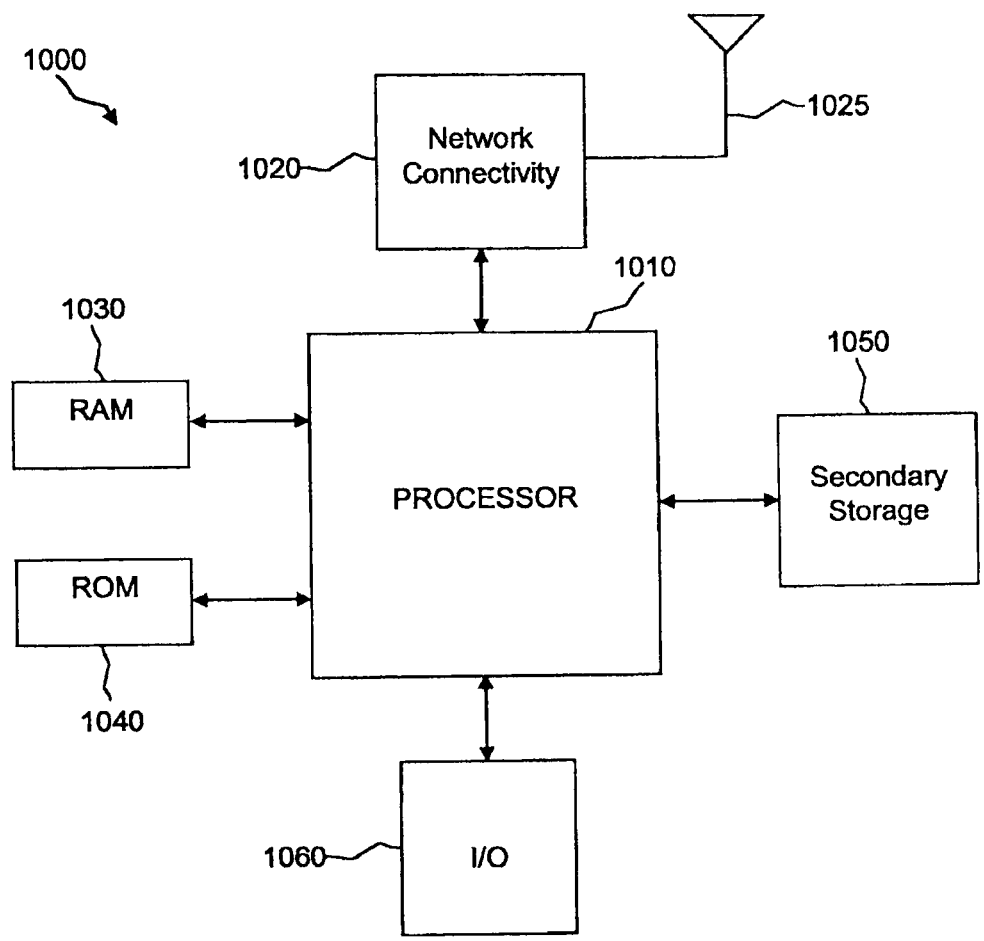
FIG. 7 is an illustrative general purpose computer system suitable for some of the various embodiments of the disclosure.

The MS 10, access device 120, and other components described above might include a processing component that is capable of executing instructions related to the actions described above. FIG. 7 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the MS 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communicating with a mobile station, comprising:
   transmitting a first radio block to the mobile station, the first radio block including an indication instructing the mobile station to enter a DTR mode; and
   before receiving an indication of whether the mobile station is in DTR mode, retransmitting to the mobile station at least one of the first radio block and a radio block previously transmitted to the mobile station using a timeslot that is not monitored by the mobile station when the mobile station is in the DTR mode.

2. The method of claim 1, wherein, when in the DTR mode, the mobile station monitors timeslots identified in the first radio block.

3. The method of claim 1, including, after transmitting the first radio block to the mobile station, transmitting a poll message to the mobile station using a timeslot that is not monitored by the mobile station when the mobile station is in the DTR mode.

4. The method of claim 3, including, when no response to the poll message is received from the mobile station, determining that the mobile station has entered the DTR mode.

5. The method of claim 3, including, when a response to the poll message is received from the mobile station, determining that the mobile station has not entered the DTR mode.

6. A method for communicating with a mobile station, comprising:
   transmitting a first radio block to the mobile station, the first radio block including an indication instructing the mobile station to enter a DTR mode; and
   before determining that the mobile station has entered the DTR mode, transmitting a poll message to the mobile station using a timeslot that will not be monitored by the mobile station when the mobile station has entered is in the DTR mode.

7. The method of claim 6, including, when no response to the poll message is received from the mobile station, determining that the mobile station has entered the DTR mode.

8. The method of claim 6, including, when a response to the poll message is received from the mobile station, determining that the mobile station has not entered the DTR mode.

9. The method of claim 6, wherein retransmitting to the mobile station the at least one of the first radio block and a radio block previously transmitted to the mobile station includes using a timeslot that is not monitored by the mobile station when the mobile station is in the DTR mode.

10. A method for communicating with a network, comprising:
    receiving a first radio block, the first radio block including an indication instructing a mobile station to enter a DTR mode and having a block sequence number;
    after receiving the first radio block, receiving a poll message; and
    when all radio blocks having block sequence numbers less than or equal to the block sequence number of the first radio block have been successfully received from the network:
    ignoring the poll message; and
    entering the DTR mode.

11. The method of claim 10, wherein the poll message is received from the network using a timeslot that is not monitored by the mobile station when the mobile station is in the DTR mode.

12. The method of claim 10, wherein the first radio block includes a second poll message, and including responding to the second poll message included in the first radio block.

13. A network component, comprising:
    a processor, the processor being configured to:
    transmit a first radio block to a mobile station, the first radio block including an indication instructing the mobile station to enter a DTR mode; and
    before receiving an indication of whether the mobile station is in DTR mode, retransmit to the mobile station at least one of the first radio block and a radio block previously transmitted to the mobile station using a timeslot that is not monitored by the mobile station when the mobile station is in the DTR mode.

14. The network component of claim 13, wherein, when in the DTR mode, the mobile station monitors timeslots identified in the first radio block.

15. The network component of claim 13, wherein the processor is configured to, after transmitting the first radio block to the mobile station, transmit a poll message to the mobile station using a timeslot that is not monitored by the mobile station when the mobile station is in the DTR mode.

16. The network component of claim 15, including, when no response to the poll message is received from the mobile station, the processor is configured to determine that the mobile station has entered the DTR mode.

17. The network component of claim 15, including, when a response to the poll message is received from the mobile station, the processor is configured to determine that the mobile station has not entered the DTR mode.

18. A mobile station, comprising:
   a processor, the processor being configured to:
   receive a first radio block, the first radio block including an indication instructing a mobile station to enter a DTR mode and having a block sequence number;
   after receiving the first radio block, receive a poll message; and
   when all radio blocks having block sequence numbers less than or equal to the block sequence number of the first radio block have been successfully received from a network:
   ignore the poll message; and
   enter the DTR mode.

19. The mobile station of claim 18, wherein the poll message is received from the network using a timeslot that is not monitored by the mobile station when the mobile station is in the DTR mode.

20. The mobile station of claim 18, wherein the first radio block includes a second poll message, and the processor is configured to respond to the second poll message included in the first radio block.

* * * * *